(12) United States Patent
Ladenheim

(10) Patent No.: US 7,134,653 B1
(45) Date of Patent: Nov. 14, 2006

(54) PORTABLE REVERSIBLE CUTTING BOARD HAVING REMOVABLE COVER AND TOOL

(76) Inventor: Cathy M. Ladenheim, 2488 Rutland Pl., Thousand Oaks, CA (US) 91362

(*) Notice: Subject to any disclaimer, the term of this patent is extended or adjusted under 35 U.S.C. 154(b) by 0 days.

(21) Appl. No.: 11/220,283

(22) Filed: Sep. 7, 2005

(51) Int. Cl.
  *B23Q 3/00* (2006.01)
(52) U.S. Cl. ............................ 269/302.1; 269/289 R
(58) Field of Classification Search ............ 269/302.1, 269/289 R, 13, 15, 303
  See application file for complete search history.

(56) References Cited

U.S. PATENT DOCUMENTS

| | | | | |
|---|---|---|---|---|
| 1,497,228 A | * | 6/1924 | Purdy ................... | 269/302.1 |
| 4,790,097 A | * | 12/1988 | Blackiston ................ | 43/4 |
| 5,527,022 A | * | 6/1996 | Gibson .................. | 269/13 |
| 6,422,551 B1 | * | 7/2002 | Brotz .................... | 269/289 R |

* cited by examiner

*Primary Examiner*—Lee D. Wilson
(74) *Attorney, Agent, or Firm*—Morland C. Fischer

(57) ABSTRACT

A portable, reversible cutting board having a first contoured face to receive a first food item to be prepared and an opposite contoured face to receive a second food item to be prepared when the cutting board is turned upside down. The first face of the cutting board has a flat cutting surface on which the first food item is prepared, a peripheral channel surrounding the cutting surface and a pouring spout communicating with the channel. Liquids running out of the first food item on the cutting surface can be drained into a container by way of the peripheral channel and the pouring spout on the front face. The opposite face of the cutting board has an arcuate depression formed therein and a pouring spout communicating with the depression. Following preparation in the depression, the second food item can be poured into a container by way of the pouring spout on the opposite face. A removable cover is adapted to be mated to the cutting board to enclose the cutting surface at the first face thereof or the depression at the opposite face.

10 Claims, 4 Drawing Sheets

PORTABLE REVERSIBLE CUTTING BOARD HAVING REMOVABLE COVER AND TOOL

BACKGROUND OF THE INVENTION

1. Field of the Invention

This invention relates to a portable, reversible cutting board having contoured top and bottom faces with a flat cutting surface on the top face and an arcuate (i.e., curved) depression on the opposite bottom face. A removable cover and a specialized tool have particular application for use with the cutting board of this invention.

2. Background Art

Cutting boards are common household items that are usually found in a kitchen. The cutting board is generally mounted at a fixed location in the kitchen and, therefore, is not capable of being moved from one room to another. In this case, once a food item has been prepared on such a fixed cutting board, the food preparer must move the item from the cutting board to a separate serving dish or tray to be transported to a different location at which the food item will be served and consumed. Consequently, an additional serving dish or tray must be available to the food preparer which must be cleaned following use. Moreover, the food preparer is required to transfer the food item from the cutting board to the serving dish or tray. Such a transfer can sometimes adversely affect the original presentation and/or the appeal of the food item. What is more, it is difficult to adequately clean a fixed cutting board. Because of its stationary nature, the cutting board cannot be removed from its fixed location and carried to a sink or a dishwasher to be cleaned by a readily available supply of soap and water.

The typical cutting board has a continuously flat surface on which the food item to be prepared is laid. In the case where the food item is meat, juices, and the like, will often run out of the meat and onto the cutting board. Because of its continuously flat surface, there is nothing to prevent the juices from running off the cutting board and onto an adjacent counter or even the floor. In either event, an undesirable mess may be created which will require that time and energy be expended for cleaning.

Accordingly, it would desirable to have available a portable cutting board that avoids the problems that are common to conventional fixed cutting boards such as those described above.

SUMMARY OF THE INVENTION

In general terms, a portable, reversible cutting board is disclosed having contoured top and bottom faces. The portable cutting board may be conveniently carried from place to place to facilitate serving, cleaning and storage. Moreover, the need for a separate serving dish/tray is advantageously avoided, inasmuch as food items can first be prepared on and then served to consumers from the same cutting board.

The contoured top face of the cutting board has a raised, flat cutting surface on which meat items may ideally be prepared. A recessed peripheral channel at the top face extends around the cutting surface. The peripheral channel communicates with a tapered pouring spout at the front of the cutting board. A handle is located at the rear of the cutting board opposite the pouring spout. Liquids, such as a juices, gravy, and the like, which run out of the meat item being prepared on the cutting surface are first pushed into the peripheral channel and then are swept around the channel into the pouring spout. By lifting the handle and thereby tilting the cutting board, the liquids can be poured from the channel into a container via the pouring spout to await a later use.

The contoured bottom face of the cutting board has a wide depression which extends upwardly towards the top face. The depression has a smooth, arcuate (i.e., curved) surface which, when the cutting board is turned upside down, creates a confined area that is ideally suited for dicing, crushing, chopping and mashing food items. The bottom face of the cutting board also has a tapered pouring spout that lies below the pouring spout at the top face and communicates with the depression. By lifting the handle and thereby tilting the cutting board, the completed food items within the depression can be poured into a container via the pouring spout at the bottom face to await a later use.

A removable cover is adapted to be mated to the cutting board so as to enclose the raised cutting surface at the top face thereof or the arcuate depression at the bottom face. The cover has a pair of slots formed at opposite ends thereof. When the cover is seated upon the top face of the cutting board, the pouring spout of the top face and the lifting handle of the cutting board are received in respective ones of the pair of slots to hold the cover on the cutting board. When the cover is seated upon the bottom face, the pouring spout of the bottom face and the lifting handle of the cutting board are received in respective slots to prevent the cover from sliding over and off the cutting board. A tool or utensil having particular application for use with the cutting board of this invention has a hard mashing and grinding tip at one end thereof and a concave scoop at the opposite end. The scoop of the tool communicates with the peripheral channel at the top face of the cutting board to urge trapped liquids and food particles towards a container. The mashing/grinding tip communicates with the arcuate depression at the bottom face of the cutting board to prepare different food products (e.g., salt, garlic cloves, onions, and the like) therewithin.

DESCRIPTION OF THE PREFERRED EMBODIMENT

Figure 1:
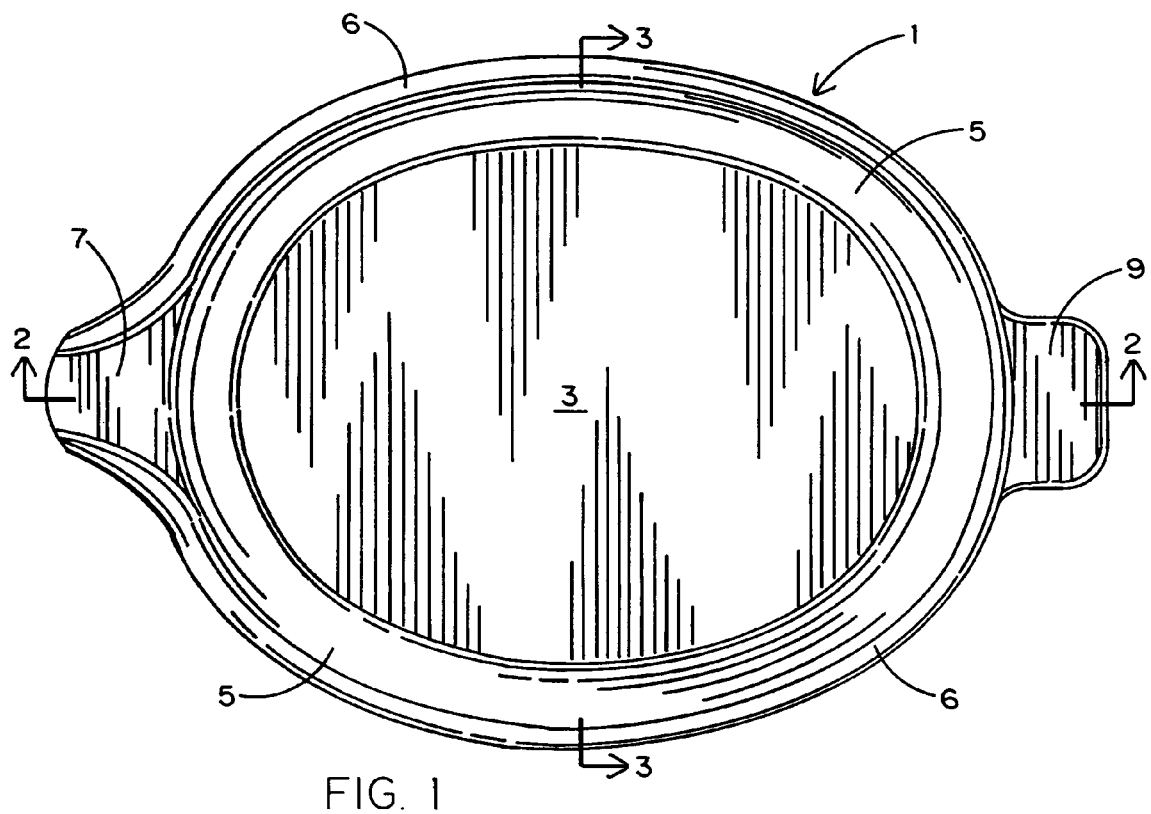
FIG. 1 shows the top face of a portable, reversible cutting board which forms the preferred embodiment of this invention.

The portable, reversible cutting board 1 according to the preferred embodiment of this invention is now described in detail while referring to the drawings. While conventional cutting boards are typically flat along their opposite top and bottom faces, the cutting board 1 herein disclosed is contoured at both of its top and bottom faces. In this same regard, while only the top face of most conventional cutting boards is utilized during food preparation, the cutting board 1 of this invention is reversible so that both the contoured top and bottom faces have utility during the preparation of different food items. That is, the cutting board can be turned upside down for use depending upon the objectives of the food preparer and the type of food to be prepared. In addition, the cutting board 1 is free-standing and movable so as to be easily cleaned in a sink or a dishwasher and conveniently transported from place to place between storage and use. In this same regard, the portable cutting board 1 doubles as a serving tray and eliminates the need for a separate dish to which the prepared food must be transferred prior to consumption.

The cutting board 1 is preferably manufactured from wood, plastic, or any other suitable material which can be easily cleaned, is relatively non-absorbent, and will resist damage when subjected to cutting, grinding and similar impact forces that are common to the preparation of certain food items. The cutting board 1 is shown in the drawings as having a generally oval configuration. However, the precise size and shape of the cutting board 1 are not to be considered as limitations of this invention.

Figure 2:
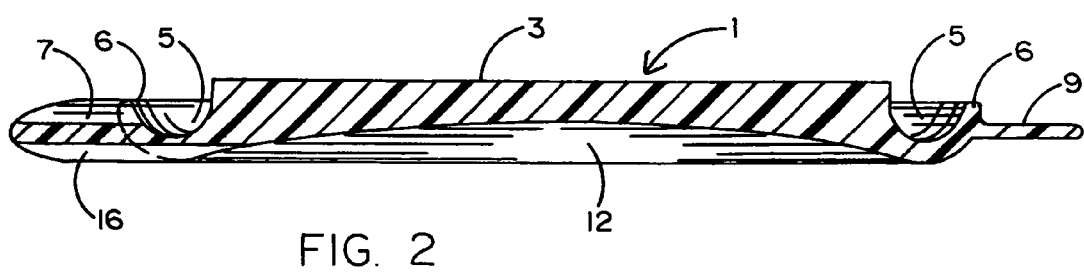
FIG. 2 is a cross-section of the portable cutting board taken along lines 2—2 of FIG. 1.
Figure 3:
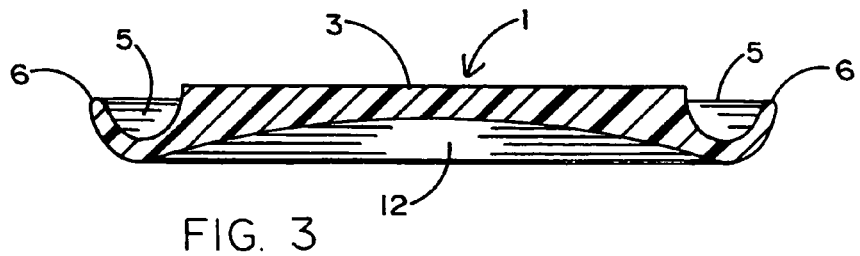
FIG. 3 is a cross-section of the portable cutting board taken along lines 3—3 of FIG. 1.
Figure 4:
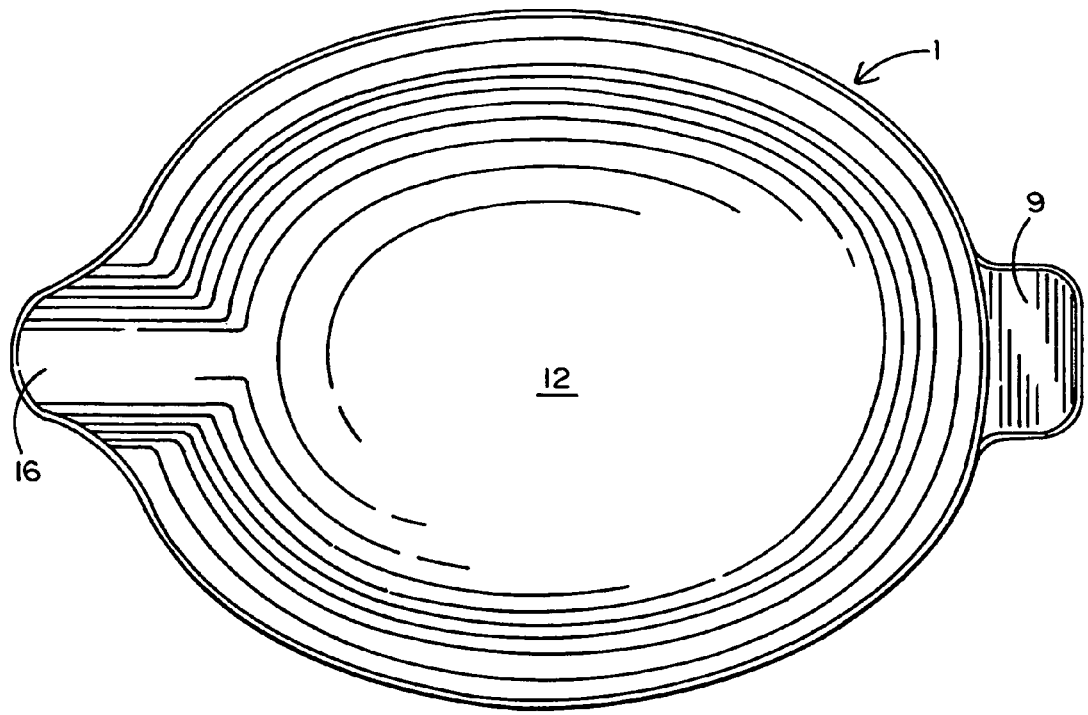
FIG. 4 shows the bottom face of the portable cutting board of FIG. 1 turned upside down.
Figure 5:
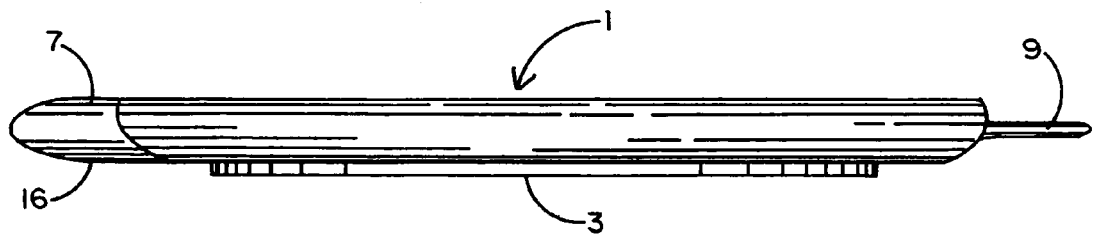
FIG. 5 is a side view of the portable cutting board.
Figure 6:
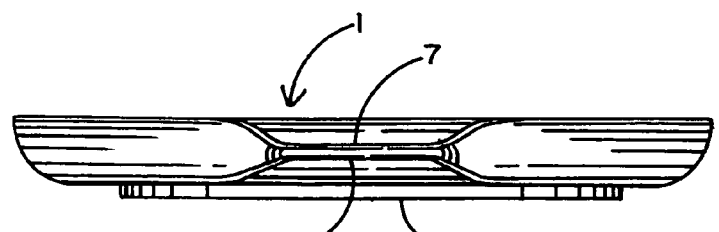
FIG. 6 is a front view of the portable cutting board.

Turning initially to FIGS. 1–3 of the drawings, the top face of the cutting board 1 is shown having a flat cutting surface 3. Surrounding the flat cutting surface 3 is a smooth peripheral channel 5. Surrounding the peripheral channel 5 is an outer lip 6. As is best shown in FIGS. 2 and 3, the flat cutting surface 3 is raised relative to the outer lip 6 and peripheral channel 5 is recessed relative to the outer lip 6. During use of the top face of the cutting board 1, any of a variety of different food items can be prepared on the cutting surface 3. However, the cutting surface 3 is ideally suited to prepare meat items. Liquids, such as juices and gravy, that run out of the meat item are pushed into the peripheral channel 5. The liquids can then be urged around the channel 5 towards a tapered pouring spout or funnel 7 that is located at the front of the cutting board 1. As is best shown in FIG. 1, the outer lip 6 which surrounds the peripheral channel 5 merges with the pouring spout 7 at the front of cutting board 1. Located at the rear of cutting board 1, opposite the pouring spout 7, is a handle 9 by which the cutting board 1 can be lifted and carried.

As is best shown in FIG. 2, the pouring spout is also recessed relative to the cutting surface 3 so as to communicate with the recessed channel 5. By virtue of the foregoing, the liquids that run from the meat item under preparation on the cutting surface 3 can be easily drained from the channel 5 of cutting board 1 via the pouring spout 7 so as to be collected in a suitable container (not shown) to await a later use. To this end, it may be necessary to tilt the cutting board 1 (e.g., by means of lifting the handle 9) to enable the liquids to run, under the influence of gravity, from channel 5 into the container.

Referring concurrently to FIGS. 1–6 of the drawings, the bottom face of the cutting board 1 is shown having a wide depression 12. As is best shown in FIGS. 2 and 3, the depression 12 has a generally smooth, arcuate (i.e., curved) configuration that extends upwardly towards the flat cutting surface 3 at the top face of the cutting board 1. The depression 12 at the bottom face of cutting board 1 has a closed configuration that is ideally suited for dicing, crushing, chopping, mashing and similar preparatory steps where a cooking tool or utensil (such as the tip of a knife or the tool designated 30 in FIG. 9) is manipulated to prepare a food item (e.g., salt, garlic cloves, onions and the like). That is to say, when the cutting board 1 is turned upside down, the curved depression provides a deep and confined area in which to prepare the food item prior to use.

Like the top face of FIG. 1, the bottom face of the cutting board 1 of FIG. 3 also has a recessed pouring spout or funnel 16. The recessed pouring spout 16 at the bottom face lies at the front of cutting board 1 directly below the recessed pouring spout 7 of the top face such that pouring spouts 7 and 16 are arranged in opposite facing alignment with one another. The pouring spout 7 communicates with the depression 12 at the bottom face. Therefore, by lifting the handle 9 which lies opposite the pouring spout 16, the completed food item can be poured from the depression 12 at the bottom face of cutting board 1 into a suitable container (not shown) via pouring spout 16 to await a later use.

As previously described, food items (e.g., meat) can be advantageously prepared and served on the cutting surface 3 of the cutting board 1 without requiring an additional serving tray. To this end, the top face of the cutting board 1 may be enclosed by a suitable cover to preserve the food item between preparation and consumption. Such a cover can be received within the recessed peripheral channel 5 to surround the cutting surface 3. In the alternative, the cover can be mounted upon the outer lip 6 to be carried with cutting board 1 from one room to another.

Figure 7:
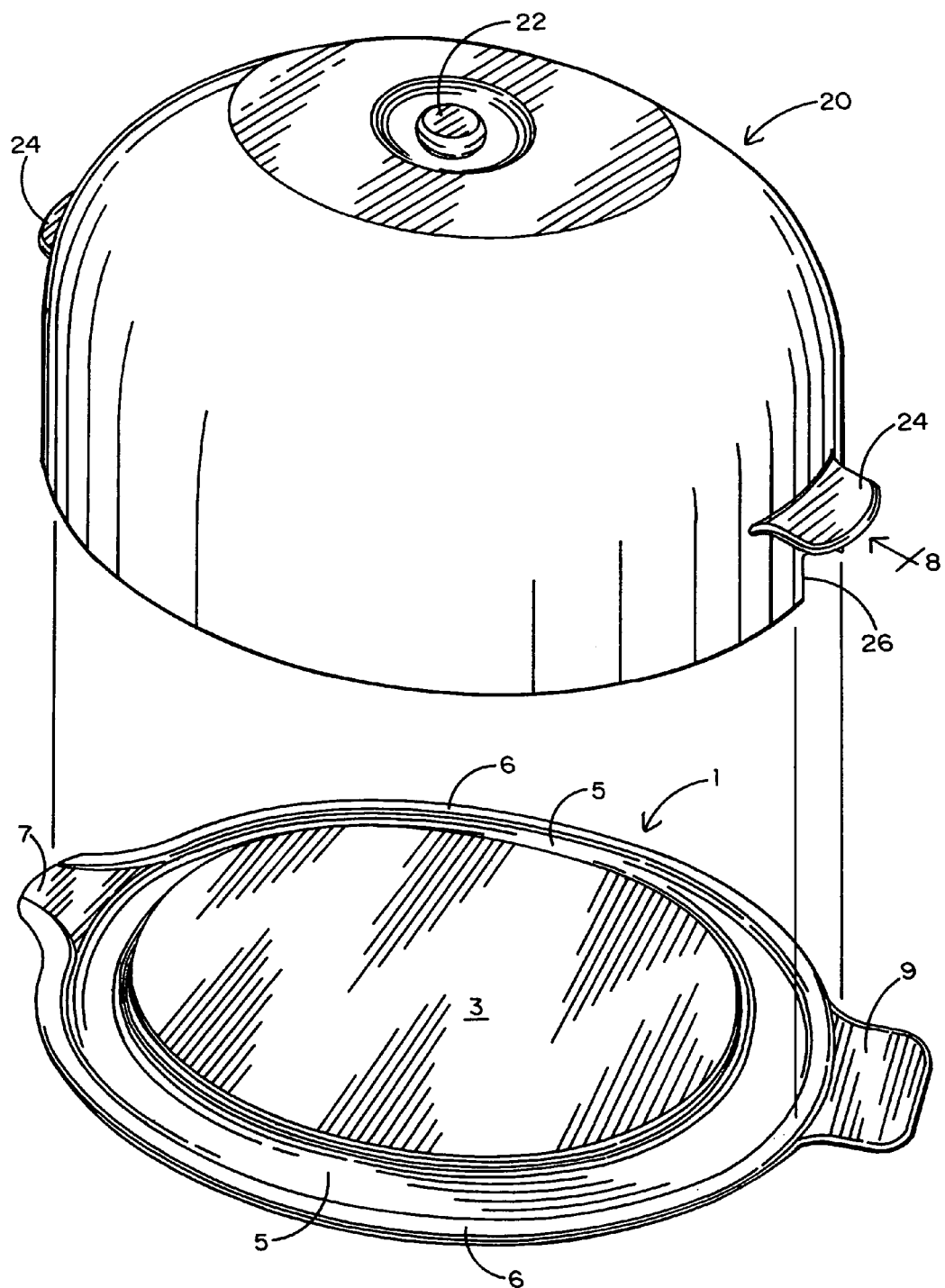
FIG. 7 shows a cover to be removably attached to the portable cutting board of FIGS. 1–6.
Figure 8:
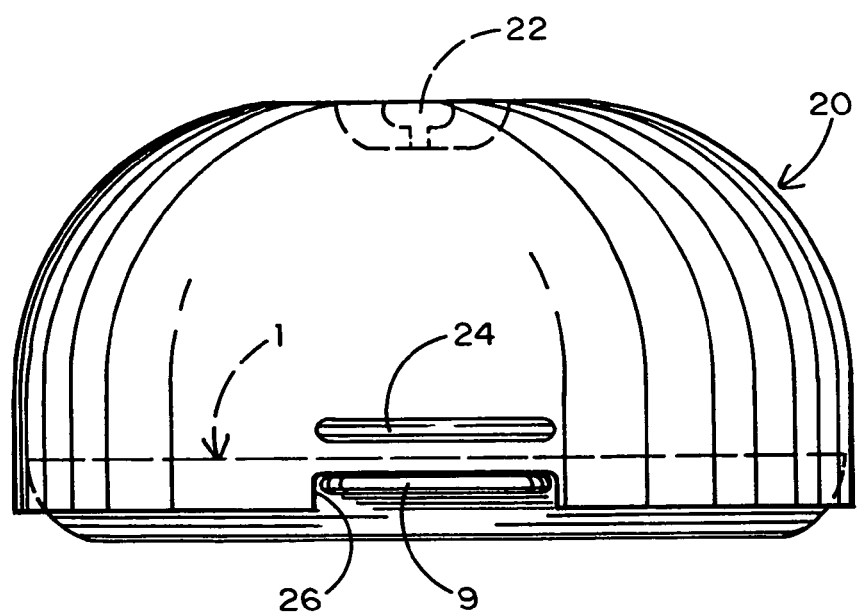
FIG. 8 shows the cover of FIG. 7 seated upon the top face of the portable cutting board.

Turning now to FIGS. 7 and 8 of the drawings, a removable cover 20 according to the preferred embodiment is shown to be mated to the cutting board 1 to enclose the raised cutting surface 3 at the top face thereof and the arcuate depression 12 at the bottom face. FIG. 8 shows the cover 20 seated upon the top face of the cutting board 1. The cover 20 is preferably bowl-shaped and manufactured from a suitable microwavable material. By virtue of the foregoing, the cover 20 can be used as a standard bowl after it is lifted off the cutting board 1 once the cutting board has been carried to a serving area. That is, by turning the bowl 20 upside down, food scraps and other discards can be placed within the cover and removed from the serving area for disposal.

To this end, the cover 20 is provided with a knob 22 at the top to which a pulling force is applied when it is desirable to lift the cover 20 off the cutting board 1. A pair of handles 24 (best shown in FIG. 8) project outwardly from opposite sides of the cover 20. The handles 24 permit the cover 20 and any food scraps placed therewithin to be conveniently carried away from the serving area once the cover 20 has been lifted off the cutting board 1 and turned upside down.

To enable the cover 20 to be held on the cutting board 1 as the cutting board is transported to the serving area, a pair of slots 26 (only one of which being visible) are formed in opposite ends of the cover. The slots 26 are sized and located below the handles 24 such that when the cover is seated upon the cutting board 1 in the manner shown in FIG. 8, the pouring spout (e.g., 7) at the front of cutting board 1 will be received in a first of the pair of slots 26, and the handle (e.g., 9) at the rear of cutting board 1 will be received in the second slot 26. With the pouring spout 7 and handle 9 located in respective slots 26, the cover 20 will be unable to slide over and off the cutting board 1 as the cutting board is moved from the food preparing area to the food serving area. What is more, the opposing pouring spout 7 and the handle 9 of the cutting board 1 and the opposing handles 24 of the cover 20 may be grasped simultaneously when it is desirable to transport the cutting board and cover reliably mated one to the other.

It may be appreciated that when the cover 20 is seated upon the top face of cutting board 1 to enclose the cutting surface 3, the pouring spout 7 and handle 9 are received through respective slots 26 in the cover. However, when the cover 20 is seated upon the bottom face of cutting board 1 to enclose the arcuate depression 12, the pouring spout 16 and the handle 9 will now be received through respective ones of the slots 26.

Figure 9:
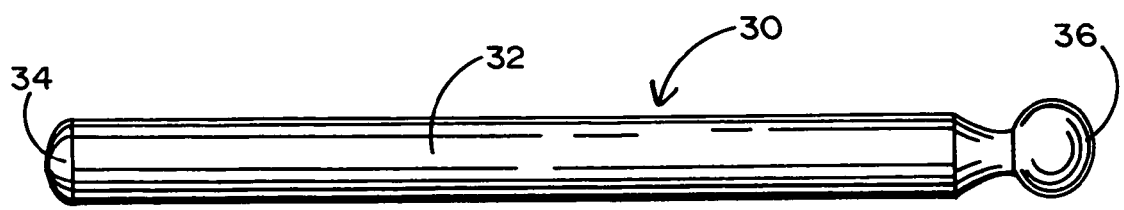
FIG. 9 shows a tool or utensil having particular application for use with the portable cutting board of FIGS. 1–6.

Turning to FIG. 9 of the drawings, there is shown a tool or utensil 30 having particular application for use with the cutting board 1 shown in FIGS. 1–6. The tool 30 is preferably manufactured from plastic, but other materials (e.g., wood) may also be used to facilitate cleaning. The tool 30 has an cylindrical intermediate rolling section 32. A hard mashing or grinding tip 34 is located at one end of the intermediate section 32 of tool 30. A concave scoop 36 is located at the opposite end of intermediate section 32.

In operation, the scoop 36 carried at one end of the tool 30 is sized and shaped to fit within the recessed peripheral channel 5 that surrounds the raised cutting surface 3 at the top face of cutting board 1. Thus, any residual liquids or food particles that remain within the channel 5 can be captured by the scoop 36 and urged towards the pouring spout 7 to be collected in a suitable container via spout 7. The mashing/grinding tip 34 that is carried at the opposite end of tool 30 is sized and shaped to communicate with the arcuate depression 12 at the bottom face of cutting board 1. Accordingly, a variety of food products (e.g., salt, garlic cloves, onions, and the like) can be conveniently prepared within the depression for storage within a suitable container via pouring spout 16. The intermediate rolling section 32 between tip 34 and scoop 36 can be used to flatten and/or tenderize food products that are laid on the raised cutting surface 3 at the top face of cutting board 1.

I claim:

1. A cutting board on which food is prepared, said cutting board including first and second faces lying opposite one another, each of said first and second faces being contoured to receive different food items thereon, said first face having a flat cutting surface, a recessed channel extending around said flat cutting surface, and a recessed pouring spout communicating with said recessed channel.

2. The cutting board recited in claim 1, wherein said cutting board is portable from one place to another.

3. The cutting board recited in claim 1, further including a handle located opposite said recessed pouring spout.

4. The cutting board recited in claim 1, wherein the second face of said cutting board has a depression formed therein to receive a food item to be prepared when said cutting board is turned upside down.

5. The cutting board recited in claim 4, wherein said second face includes a pouring spout recessed therein and communicating with said depression.

6. A cutting board on which food is prepared, said cutting board including a first face to receive a food item and a second face to receive a different food item when said cutting board is turned upside down, said first face having a cutting surface and a recessed channel surrounding at leaslt some of said cutting surface, and said second face having a depression formed therein and extending towards the recessed channel of said first face, a first pouring spout communicating with the recessed channel of said first face and a second pouring spout communicating with the depression of said second face.

7. The cutting board recited in claim 6, wherein the respective pouring spouts of said first and second faces lie one above the other in opposite facing alignment.

8. The cutting board recited in claim 7, further including a handle lying opposite the respective pouring spouts of said first and second faces, said handle receiving a lifting force whereby to tilt said cutting board or transport said cutting board from one place to another.

9. The combination, comprising:

a cutting board on which food is prepared, said cutting board including a handle to which a lifting force is applied, a top face to receive a food item and a bottom face to receive a different food item when said cutting board is turned upside down, said top face having a first pouring spout, a cutting surface and a peripheral channel surrounding at least some of said cutting surface, and said bottom face having a second pouring spout and a depression communicating with said second pouring spout and extending upwardly towards said top face; and a removable cover to be seated upon each of the top and bottom faces of said cutting board to enclose the cutting surface of said top face and the depression of said bottom face, said removable cover having a pair of slots formed therein for respectively receiving said first pouring spout and said lifting handle when said cover is seated upon the top face of said cutting board and respectively receiving said second pouring spout and said lifting handle when said cover is seated upon the bottom face of said cutting board.

10. The combination recited in claim 9, further comprising a tool to be used with said cutting board, said tool having a mashing and grinding tip at one end thereof adapted to mash and grind food products within said depression at the bottom face of said cutting board, said tool also having a scoop at the opposite end thereof adapted to ride around said peripheral channel at the top face of said cutting board to capture and move liquids and food particles that are trapped within said peripheral channel.

* * * * *